US012746872B2

(12) United States Patent
Won

(10) Patent No.: US 12,746,872 B2
(45) Date of Patent: Sep. 29, 2026

(54) COMMUNICATION LAMP AND CONTROL METHOD OF COMMUNICATION LAMP

(71) Applicant: HYUNDAI MOBIS CO., LTD., Seoul (KR)

(72) Inventor: Yong Hee Won, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 421 days.

(21) Appl. No.: 18/476,451

(22) Filed: Sep. 28, 2023

(65) Prior Publication Data

US 2024/0123898 A1 Apr. 18, 2024

(30) Foreign Application Priority Data

Oct. 13, 2022 (KR) ........................ 10-2022-0131470

(51) Int. Cl.

| | |
|---|---|
| ***B60Q 1/50*** | (2006.01) |
| ***B60Q 1/00*** | (2006.01) |
| ***F21S 41/19*** | (2018.01) |
| ***G02F 1/1334*** | (2006.01) |
| ***G09F 9/35*** | (2006.01) |

(52) U.S. Cl.

CPC ........... *B60Q 1/507* (2022.05); *B60Q 1/0088* (2013.01); *B60Q 1/5037* (2022.05); *F21S 41/192* (2018.01); *G02F 1/1334* (2013.01); *G09F 9/35* (2013.01)

(58) Field of Classification Search

None

See application file for complete search history.

(56) References Cited

U.S. PATENT DOCUMENTS

| | | | | |
|---|---|---|---|---|
| 2020/0353817 | A1* | 11/2020 | Nakada | F21S 41/675 |
| 2023/0280613 | A1* | 9/2023 | Pasca | G02B 27/0101 349/11 |
| 2024/0288700 | A1* | 8/2024 | Lampen | G02B 27/0101 |

FOREIGN PATENT DOCUMENTS

| | | |
|---|---|---|
| KR | 20210123842 A | 10/2021 |

* cited by examiner

*Primary Examiner* — Richard H Kim

(74) *Attorney, Agent, or Firm* — NovoTechIP International PLLC

(57) ABSTRACT

The present invention relates to a lamp, and more particularly, to a vehicle lamp. A communication lamp and a control method of the communication lamp according to the present invention are capable of implementing both a technology of performing light irradiation using a road surface in front of a vehicle as a screen and a technology of performing light irradiation using a vehicle grille as a screen without adding an additional component, by applying a polymer-dispersed liquid crystal (PDLC) film whose transmittance changes depending on whether or not a voltage is received and automatically adjusting a phase of an optical system according to the transmittance.

8 Claims, 10 Drawing Sheets

COMMUNICATION LAMP AND CONTROL METHOD OF COMMUNICATION LAMP

CROSS-REFERENCE TO RELATED APPLICATIONS

This application claims priority under 35 U.S.C. § 119 to Korean Patent Application No. 10-2022-0131470, filed on Oct. 13, 2022, in the Korean Intellectual Property Office, the disclosure of which is incorporated herein by reference in its entirety.

TECHNICAL FIELD

The following disclosure relates to a lamp, and more particularly, to a vehicle lamp.

BACKGROUND

A vehicle digital light according to the related art performs communication with other road users by using an optical signal. For example, signals with connotations such as "I'm watching you", "I'll stay here", "Watch your back", and "Go ahead" may be sent to the outside through a screen using a vehicle grille, a vehicle headlight, a turn signal, a brake light, or the like. Such a communication method is a technology field that is currently attracting attention because it may enable intuitive communication with pedestrians to reduce an occurrence rate of safety accidents, and may improve the design performance of the vehicle itself.

In particular, as the development of electric vehicles gains momentum, a grille having a single surface unlike a grille applied to an existing internal combustion engine is applied as a digital front grille, and a grille lamp technology including various functions is actively being developed using such a grille. In addition, a technology for implementing information on a road surface is also applied to existing headlamps, and such headlamps are being mass-produced.

However, both of the technology of performing light irradiation using a road surface in front of a vehicle as a screen to display information to a vehicle driver, and the technology of performing light irradiation using the above-described vehicle grille as a screen for communication with outside pedestrians and vehicles are required in some situations, and there is a problem in that a manufacturing cost increases as components for implementing the respective technologies are separately provided. Korean Patent Laid-Open Publication No. 10-2021-0123842 entitled "Flip Dot Display Apparatus for Vehicle" is an example of a related art document.

SUMMARY

An embodiment of the present invention is directed to providing a communication lamp and a control method of the communication lamp capable of implementing both a technology of performing light irradiation using a road surface in front of a vehicle as a screen and a technology of performing light irradiation using a vehicle grille as a screen without adding an additional component, by applying a polymer-dispersed liquid crystal (PDLC) film whose transmittance changes depending on whether or not a voltage is received and automatically adjusting a phase of an optical system according to the transmittance.

In one general aspect, a communication lamp includes: a selective transmission film whose light transmittance is adjusted according to a control signal; an optical system including a light source, first and second optical systems irradiated with light from the light source and transferring the light to the outside, and a housing in which the first optical system and the second optical system are housed; a moving unit changing positions of the first and second optical systems; and a control unit receiving information from inside and outside and controlling the selective transmission film, the light source, and the moving unit based on the received information.

The housing may have a central portion extending in a predetermined extension direction and an intersecting portion extending in a direction perpendicular to the central portion and having a predetermined region intersecting the central portion, the selective transmission film may be disposed outside the housing and disposed on one side of the housing in the extension direction of the central portion.

The first optical system may be housed in the central portion, and the second optical system may be housed in the intersecting portion.

The first optical system may be housed in the central portion of the housing and may be fixedly housed at an end portion on the other side of the central portion.

The moving unit may include a first actuator that linearly moves the second optical system in the direction perpendicular to the central portion.

The moving unit may include a first actuator that linearly moves the second optical system in the direction perpendicular to the central portion, and a second actuator that linearly moves the first optical system in the extension direction of the central portion.

The control unit may receive an average light intensity of a surrounding area, and the control unit may control the light source in such a way that a light intensity of the light source becomes lower than a predetermined first light intensity criterion in a case where the average light intensity of the surrounding area is equal to or higher than a predetermined reference value, and control the light source in such a way that the light intensity of the light source becomes higher than the first light intensity criterion in a case where the average light intensity of the surrounding area is lower than the predetermined reference value.

The control unit may receive time information, and in a case where a current time is included in a pre-designated night time zone, the control unit may determine a first mode as a light irradiation mode, supply power to the selective transmission film to increase the light transmittance to a maximum, and control the moving unit in such a way that the optical system is at a first position where the light from the light source passes through only the first optical system.

The control unit may receive time information, and in a case where a current time is included in a pre-designated day time zone, the control unit may determine a second mode as a light irradiation mode, at least partially supply power to the selective transmission film to perform control in such a way that the selective transmission film has a predetermined light transmittance, and control the moving unit in such a way that the optical system is at a second position where the light from the light source sequentially passes through the first optical system and the second optical system.

The control unit receives navigation information, and in a case where the navigation information indicates that a current location is within an area designated as a downtown, the control unit may determine a second mode as a light irradiation mode, at least partially supply power to the selective transmission film to perform control in such a way that the selective transmission film has a predetermined light transmittance, and control the moving unit in such a way that the optical system is at a second position where the light from the light source sequentially passes through the first optical system and the second optical system.

In another general aspect, a control method of a communication lamp includes: step (a) of receiving, by a control unit, at least one of an average light intensity of a surrounding area, time information, or navigation information; step (b) of determining and controlling, by the control unit, a light intensity of a light source based on the information received in step (a); step (c) of determining, by the control unit, a light irradiation mode based on the information received in step (a); step (d) of controlling, by the control unit, a light transmittance of a selective transmission film according to the light irradiation mode determined in step (c); and step (e) of controlling, by the control unit, a moving unit according to the light irradiation mode determined in step (c).

In step (a), the control unit may receive the time information and the navigation information, and step (c) may include step (c1) of determining, by the control unit, a first mode as the light irradiation mode in a case where a current time is included in a pre-designated night time zone or the navigation information indicates that a current location is outside an area designated as a downtown.

In a case where the first mode is determined as the light irradiation mode in step (c), step (d) may include step (d1) of controlling, by the control unit, the selective transmission film by determining the light transmittance of the selective transmission film to be a maximum value.

In a case where the first mode is determined as the light irradiation mode in step (c), step (e) may include step (e1) of controlling, by the control unit, the moving unit to adjust a position of at least one of a first optical system or a second optical system to be a first position.

In step (a), the control unit may receive the time information and the navigation information, and step (c) may include step (c2) of determining, by the control unit, a second mode as the light irradiation mode in a case where a current time is included in a pre-designated day time zone or the navigation information indicates that a current location is within an area designated as a downtown.

In a case where the second mode is determined as the light irradiation mode in step (c), step (d) may include step (d2) of controlling, by the control unit, the selective transmission film by determining the light transmittance of the selective transmission film to be a predetermined target value.

Step (e) may include step (e2) of controlling, by the control unit, the moving unit to adjust a position of at least one of a first optical system or a second optical system to be a second position.

DETAILED DESCRIPTION

Hereinafter, the technical spirit of the present invention will be described in more detail with reference to the accompanying drawings. Terms and words used in the present specification and claims are not to be construed as general or dictionary meanings, but are to be construed as meanings and concepts meeting the technical ideas of the present invention based on a principle that the present inventors may appropriately define the concepts of terms in order to describe their inventions in best mode.

Figure 1:
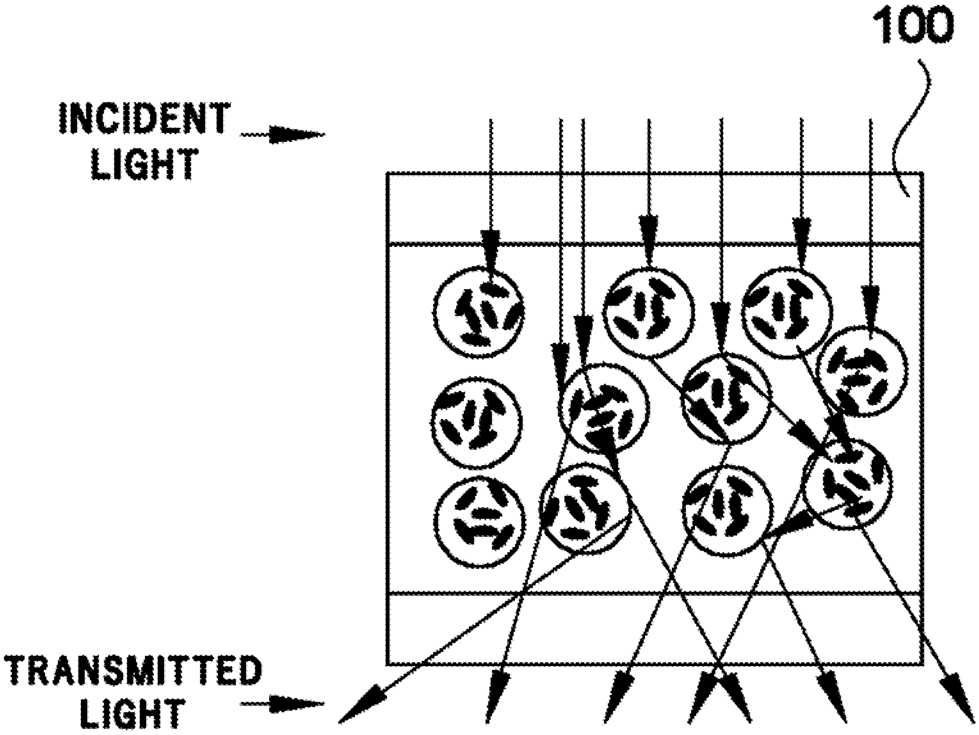
FIGS. 1 and 2 are schematic diagrams illustrating functions of a selective transmission film according to the present invention.

Hereinafter, a communication lamp 1000 according to the present invention will be described with reference to FIGS. 1 to 3.

The communication lamp 1000 according to the present invention may include a selective transmission film 100. As illustrated in FIGS. 1 and 2, a light transmittance of the selective transmission film 100 may be adjusted according to a control signal. More specifically, when a voltage is not supplied as illustrated in FIG. 1, the light transmittance may be lowered as contained liquid crystal particles are irregularly arranged, and when a voltage is supplied as illustrated in FIG. 2, the light transmittance may be increased as the liquid crystal particles are regularly arranged.

When such a selective transmission film 100 is applied to a vehicle, the selective transmission film 100 may be attached to a front grille G of the vehicle. At this time, the front grille G of the vehicle is formed of a transparent material, so that the light transmittance is determined according to the transmittance of the selective transmission film 100. That is, when the light transmittance of the selective transmission film 100 is low, the selective transmission film 100 and the grille G may serve as a screen, and a message or graphic for communication may be displayed on the grille G when viewed from the outside. When the light transmittance of the selective transmission film 100 is high, light is radiated to the outside of the vehicle, and a message or graphic for communication may be displayed on a road surface R within a range visible to a driver.

The communication lamp 1000 according to the present invention may further include an optical system 200 and a moving unit 300. More specifically, as illustrated in FIG. 3, the optical system 200 may include a light source, first and second optical systems 210 and 220 irradiated with light from the light source and transferring the light to the outside, and a housing 230 in which the first optical system 210 and the second optical system 220 are housed. In addition, the moving unit 300 may be connected to each of the first optical system 210 and the second optical system 220, and a position of the moving unit 300 may be changed. At this time, the first optical system 210 and the second optical system 220 may linearly move by the moving unit 300, and the housing 230 may have a groove or protrusion for guiding the linear movement of the first optical system 210 and the second optical system 220, the groove or protrusion being formed in the housing 230.

Since the second optical system 220 provided separately from the first optical system 210 is included, a path of light may be easily changed by adjusting the positions of the first optical system 210 and the second optical system 220 even in a case where a target focal position changes due to a change in position where an image is to be formed (the grille G or the road surface R).

More specifically, the housing 230 may have a central portion 231 extending in a predetermined extension direction, and an intersecting portion 232 extending in a direction perpendicular to the central portion 231 and having a predetermined region intersecting the central portion 231. That is, the housing 230 may be formed in a cross shape, and the central portion 231 and the intersecting portion 232 may intersect each other at off-center positions. The selective transmission film 100 is attached to the grille G and disposed outside the housing 230, and it is preferable that the central portion 231 extends toward the center of the grille G and the selective transmission film 100. That is, the selective transmission film 100 is preferably disposed on one side of the housing 230 in the extension direction of the central portion 231.

In this case, the first optical system 210 may be housed in the central portion 231, and the second optical system 220 may be housed in the intersecting portion 232. In addition, the first optical system 210 may be housed in the central portion 231 of the housing 230 and may be fixedly housed at an end portion on the other side of the central portion 231, and it is preferable that the moving unit 300 includes a first actuator 310 that linearly moves the second optical system 220 in the direction perpendicular to the central portion 231. At this time, the first actuator 310 may be connected to the second optical system 220 and include a screw extending in a moving direction. Accordingly, the second optical system 220 may be linearly moved.

Figure 2:
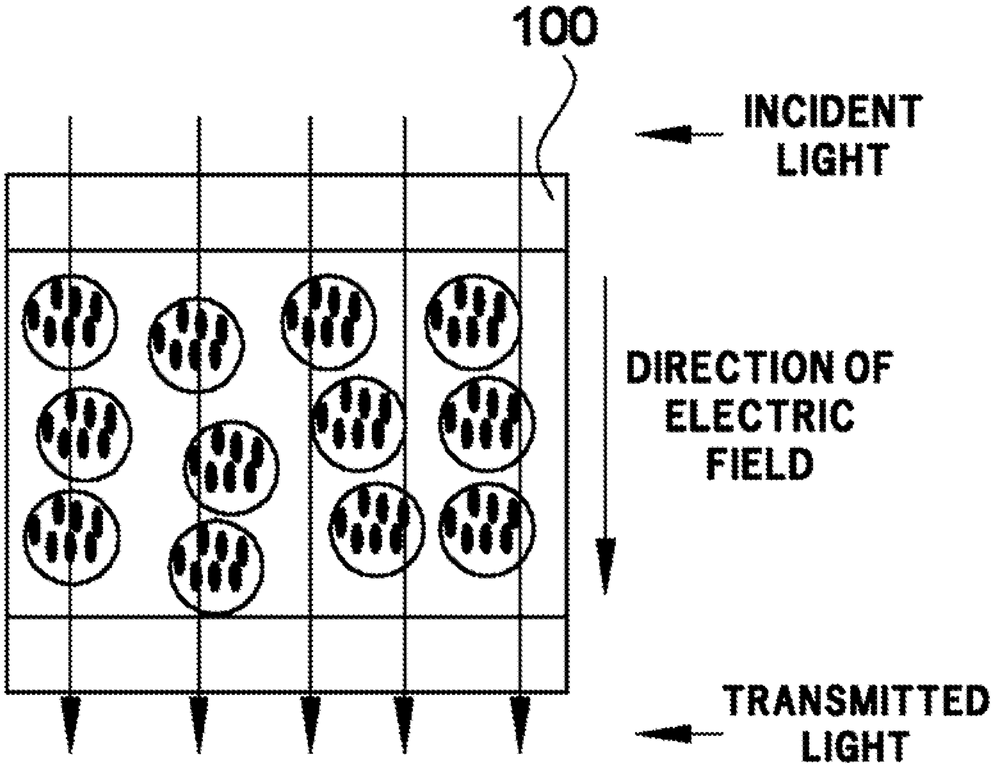
Figure 3:
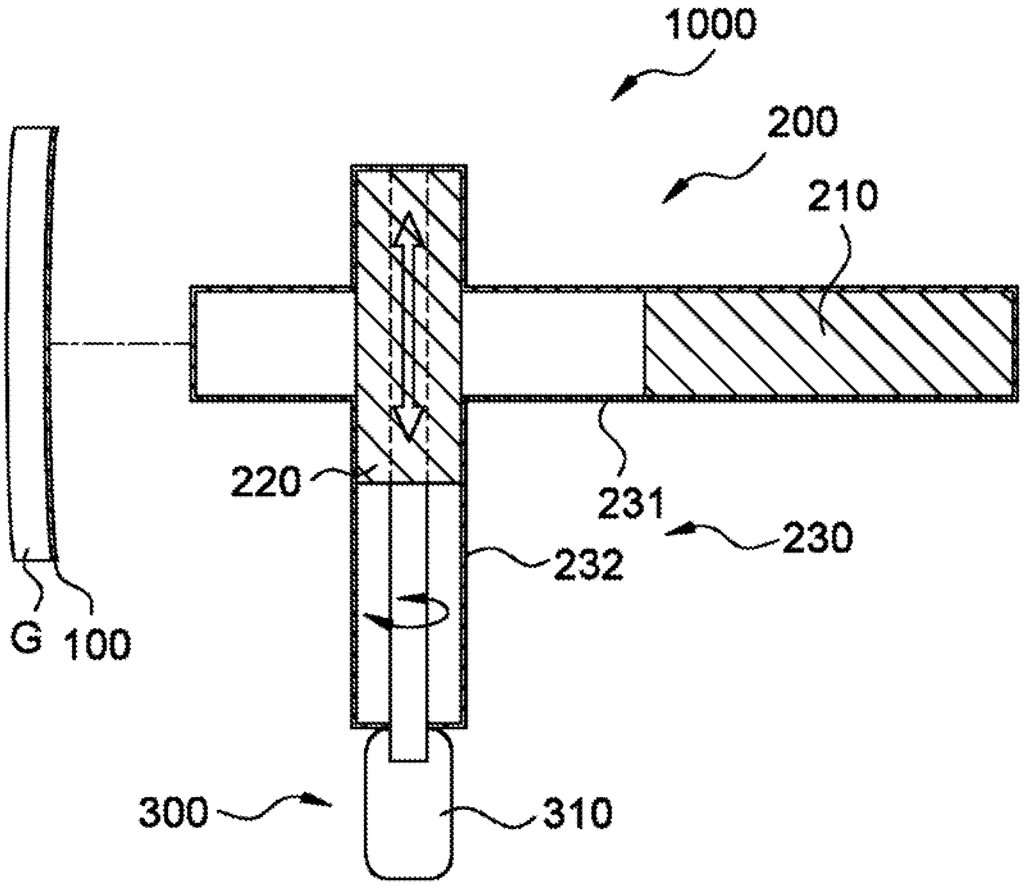
FIG. 3 is a plan view illustrating a communication lamp according to the present invention.

That is, light from the light source may pass through only the first optical system 210 and be radiated to the selective transmission film 100 at a position where the second optical system 220 does not interfere with the first optical system 210 (hereinafter, referred to as a first position), and light from the light source may sequentially pass through the first optical system 210 and the second optical system 220 and be radiated to the selective transmission film 100 at a position where the second optical system 220 interferes with the first optical system 210 (hereinafter, referred to as a second position as illustrated in FIG. 2). Accordingly, a position where an image is to be formed may be adjusted without moving the first optical system 210.

The communication lamp 1000 according to the present invention may further include a control unit 400. The control unit 400 may receive information from inside and outside. For example, the control unit 400 may receive information from a sensor attached to the vehicle or a navigation system, and may receive time information from a timer built in the control unit 400. The control unit 400 may control the light transmittance of the selective transmission film 100 described above and the light source of the optical system 200 based on the received information and may also control the moving unit 300 that adjusts the positions of the first optical system 210 and the second optical system 220.

Hereinafter, the communication lamp 1000 according to an embodiment of the present invention will be described with reference to FIG. 4.

Figure 4:
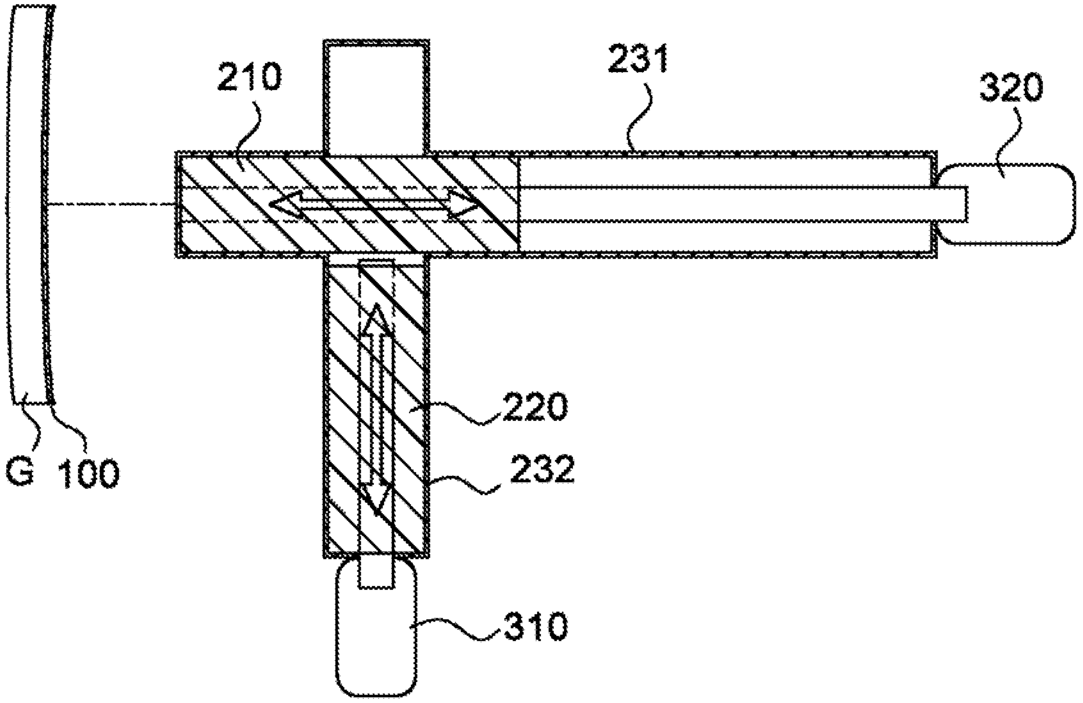
FIG. 4 is a plan view illustrating a communication lamp according to an embodiment of the present invention.

As illustrated in FIG. 4, the moving unit 300 may include both the first actuator 310 that linearly moves the second optical system 220 in the direction perpendicular to the central portion 231, and a second actuator 320 that linearly moves the first optical system 210 in the extension direction of the central portion 231. Here, the first actuator 310 and the second actuator 320 may be connected to the second optical system 220 and the first optical system 210, respectively, and may include screws extending in the moving direction.

In addition, it is preferable that the first optical system 210 is not fixed to the central portion 231 of the housing 230. Further, the groove or protrusion for guiding the linear movement of the first optical system 210 may be formed on an inner side of the central portion 231. As the communication lamp 1000 according to an embodiment of the present invention is applied, a focal length may be adjusted by adjusting a distance between the first optical system 210 and the selective transmission film 100 when the second optical system 220 is at the first position, that is, when light from the light source passes through only the first optical system 210.

Figure 5:
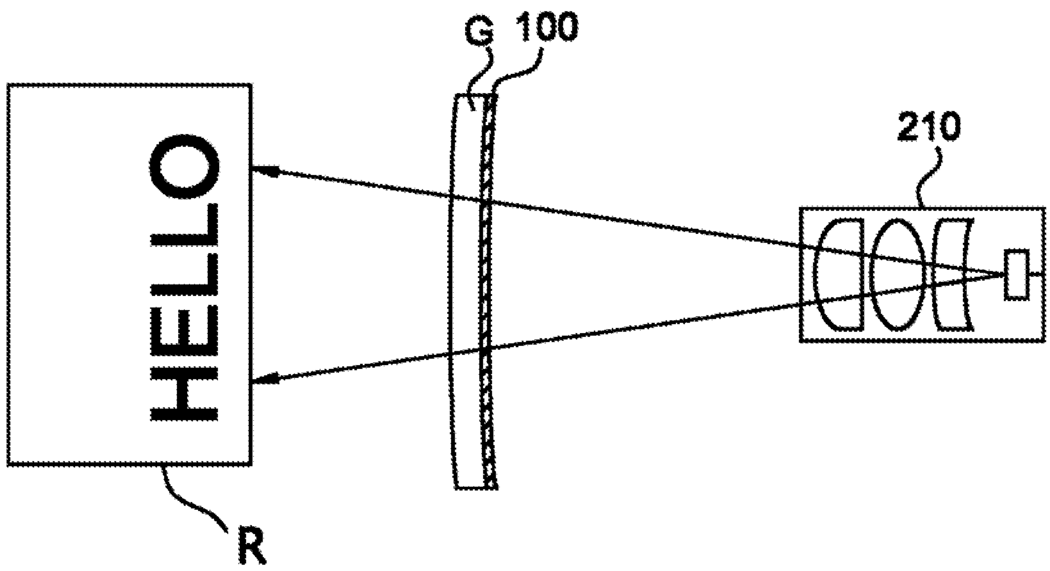
FIG. 5 is a schematic view illustrating an optical path when a control unit according to the present invention executes a first control mode.
Figure 6:
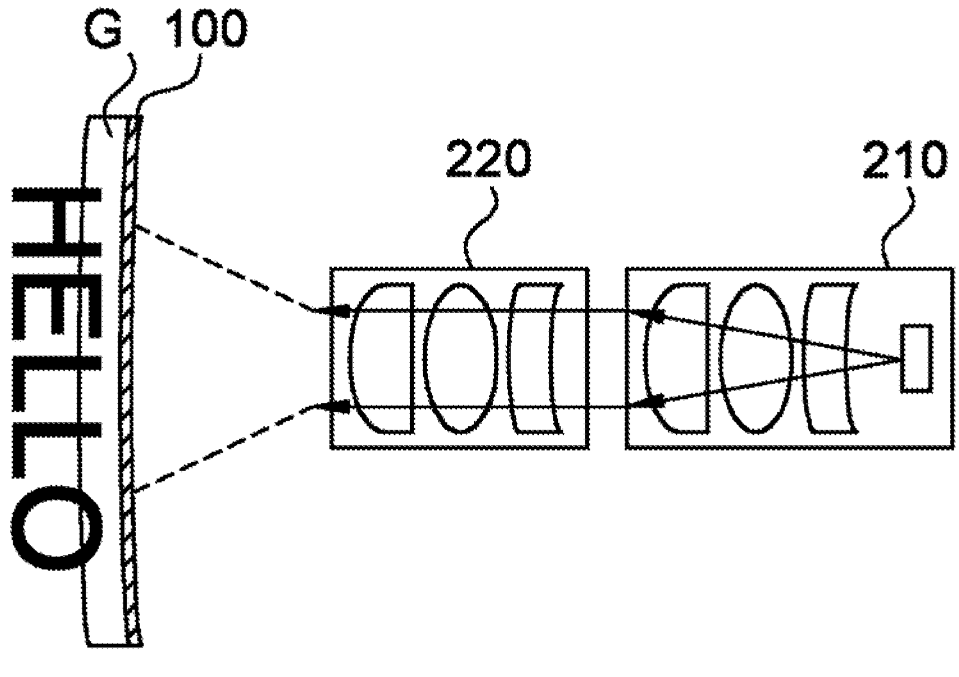
FIG. 6 is a schematic view illustrating an optical path when the control unit according to the present invention executes a second control mode.

Hereinafter, the control unit 400 will be described in more detail with reference to FIGS. 5 and 6.

The control unit 400 may receive an average light intensity of a surrounding area of the vehicle to which the communication lamp 1000 according to the present invention is applied. At this time, in a case where the average light intensity of the surrounding area is equal to or higher than a predetermined reference value, the control unit 400 may control the light source in such a way that the light intensity of the light source becomes lower than a predetermined first light intensity criterion, and in a case where the average light intensity of the surrounding area is lower than the predetermined reference value, the control unit 400 may control the light source in such a way that the light intensity of the light source becomes higher than the first light intensity criterion. That is, in a case where the average light intensity of the surrounding area is sufficiently high, the light intensity of the light source is adjusted to be relatively low, and in a case where the average light intensity of the surrounding area is low and it is thus necessary to secure visibility for the driver, the light intensity of the light source is adjusted to be relatively high. Accordingly, there is an effect of not only securing visibility for the driver but also reducing power consumption.

In addition, the control unit 400 may designate a first control mode and a second control mode in controlling the selective transmission film 100 and the moving unit 300. In more detail, when the first control mode is executed, the transmittance of the selective transmission film 100 may be adjusted to be high, and light from the light source may be transmitted through the grille G and the selective transmission film 100 and radiated to the road surface R to send a signal to the driver. When the second control mode is executed, the transmittance of the selective transmission film 100 may be adjusted to be low, and light from the light source may be radiated in such a way as to form an image on the grille G to send a signal to an outside pedestrian and a driver of a neighboring vehicle.

Here, the first control mode may be selected in a case where the time information may be received and the current time is included in a pre-designated night time zone. At this time, as illustrated in FIG. 5, power may be supplied to the selective transmission film 100 to increase the light transmittance to the maximum, and the moving unit 300 may be controlled in such a way that the optical system 200 is at the first position where light from the light source passes through only the first optical system 210. Accordingly, light from the light source may be radiated to the road surface R to display road surface R information on the road surface R.

Further, the second control mode may be selected in a case where the time information may be received and the current time is included in a pre-designated day time zone or in a case where the current location is within an area designated as a downtown based on navigation information. At this time, as illustrated in FIG. 6, power is at least partially supplied to the selective transmission film 100 to perform control in such a way that the selective transmission film 100 has a predetermined light transmittance. The predetermined light transmittance may be lower than the light transmittance in the first control mode. Further, the moving unit 300 may be controlled in such a way that the optical system 200 is at the second position where light from the light source sequentially passes through the first optical system 210 and the second optical system 220. At this time, the light transmittance of the selective transmission film 100 may be adjusted to be similar to that of a general rear screen. Accordingly, a communication message may be displayed as light on the grille G when viewed from the outside of the vehicle.

Hereinafter, a control method of the communication lamp according to the present invention will be described with reference to FIGS. 7 to 10.

Figure 7:
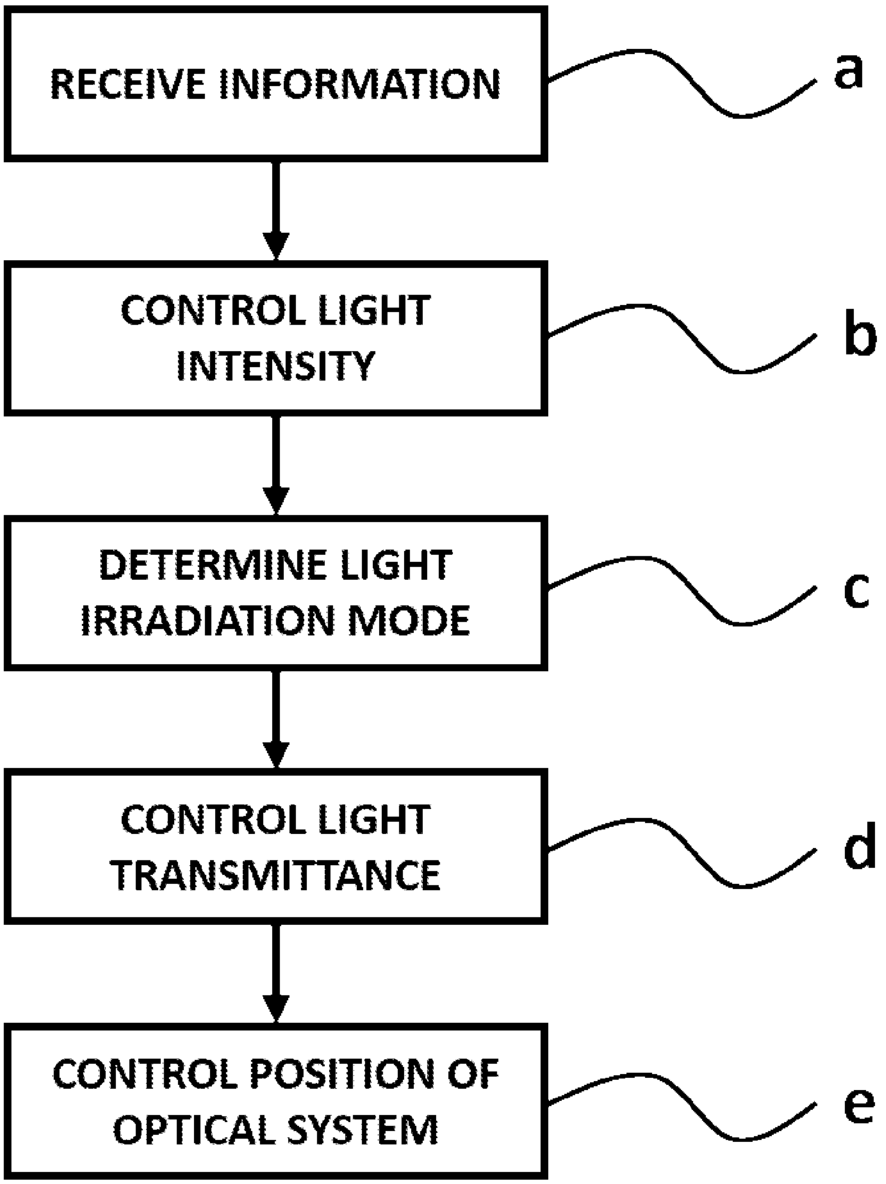
FIG. 7 is a flowchart illustrating a control method of the communication lamp according to the present invention.

It is preferable that the control method of the communication lamp according to the present invention includes: step (a) of receiving, by the control unit 400, at least one of the average light intensity of the surrounding area, the time information, or the navigation information; step (b) of determining and controlling, by the control unit 400, the light intensity of the light source based on the information received in step (a); step (c) of determining, by the control unit 400, a light irradiation mode based on the information received in step (a); step (d) of controlling, by the control unit 400, the light transmittance of the selective transmission film 100 according to the light irradiation mode determined in step (c); and step (e) of controlling, by the control unit 400, the moving unit 300 according to the light irradiation mode determined in step (c), as illustrated in FIG. 7.

In step (b), in a case where the average light intensity of the surrounding area is equal to or higher than the predetermined reference value, the control unit 400 may control the light source in such a way that the light intensity of the light source becomes lower than the predetermined first light intensity criterion, and in a case where the average light intensity of the surrounding area is lower than the predetermined reference value, the control unit 400 may control the light source in such a way that the light intensity of the light source becomes higher than the first light intensity criterion. That is, in a case where the average light intensity of the surrounding area is sufficiently high, the light intensity of the light source is adjusted to be relatively low, and in a case where the average light intensity of the surrounding area is low and it is thus necessary to secure visibility for the driver, the light intensity of the light source is adjusted to be relatively high. Accordingly, there is an effect of not only securing visibility for the driver but also reducing power consumption.

Figure 8:
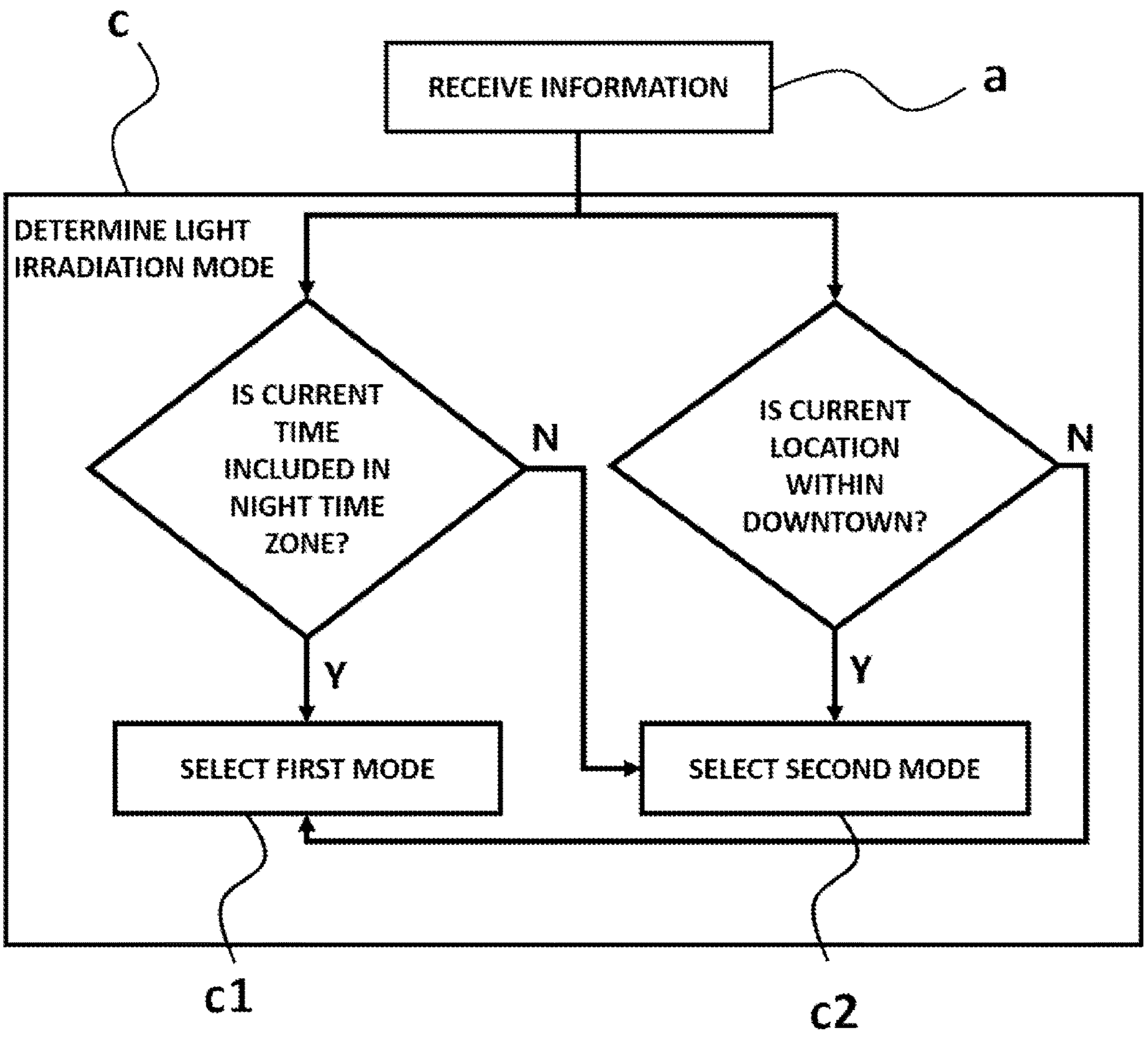
FIG. 8 is a flowchart illustrating detailed steps of a light irradiation mode determination step in the control method of the communication lamp according to the present invention.

Further, as illustrated in FIG. 8, in step (a), the control unit 400 may receive the time information and the navigation information, and in step (c), the control unit 400 may determine the first mode as the light irradiation mode (c1) in a case where the current time is included in the pre-designated night time zone or the navigation information indicates that the current location is outside the area designated as a downtown. Further, in step (a), the control unit 400 may receive the time information and the navigation information, and in step (c), the control unit 400 may determine the second mode as the light irradiation mode (c2) in a case where the current time is included in the pre-designated day time zone or the navigation information indicates that the current location is within the area designated as a downtown.

Figure 9:
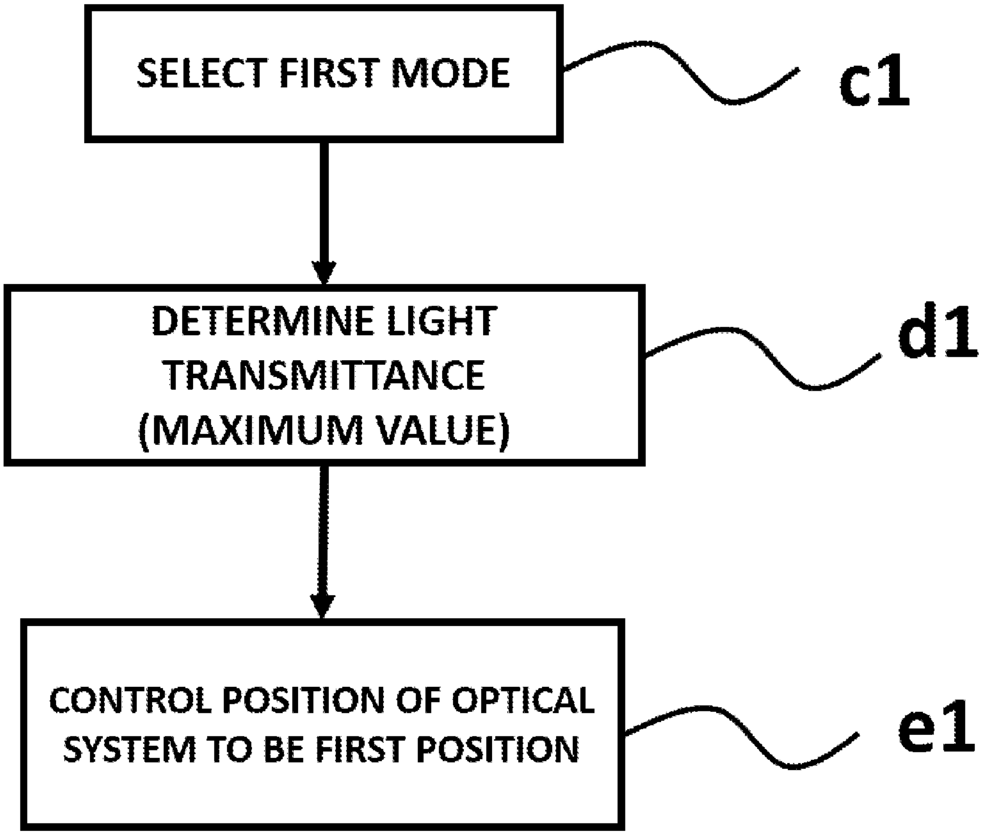
FIG. 9 is a flowchart illustrating detailed steps of a light transmittance control step and an optical system position control step when the first control mode is executed.

Thereafter, as illustrated in FIG. 9, in a case where the first mode is determined as the light irradiation mode in step (c), step (d) may include step (d1) of controlling, by the control unit 400, the selective transmission film 100 by determining the light transmittance of the selective transmission film 100 to be a maximum value, and step (e) may include step (e1) of controlling, by the control unit 400, the moving unit 300 to adjust at least one of the position of the first optical system 210 or the position of the second optical system 220 to be the first position. Accordingly, light from the light source may be radiated to the road surface R to display road surface R information on the road surface R.

Figure 10:
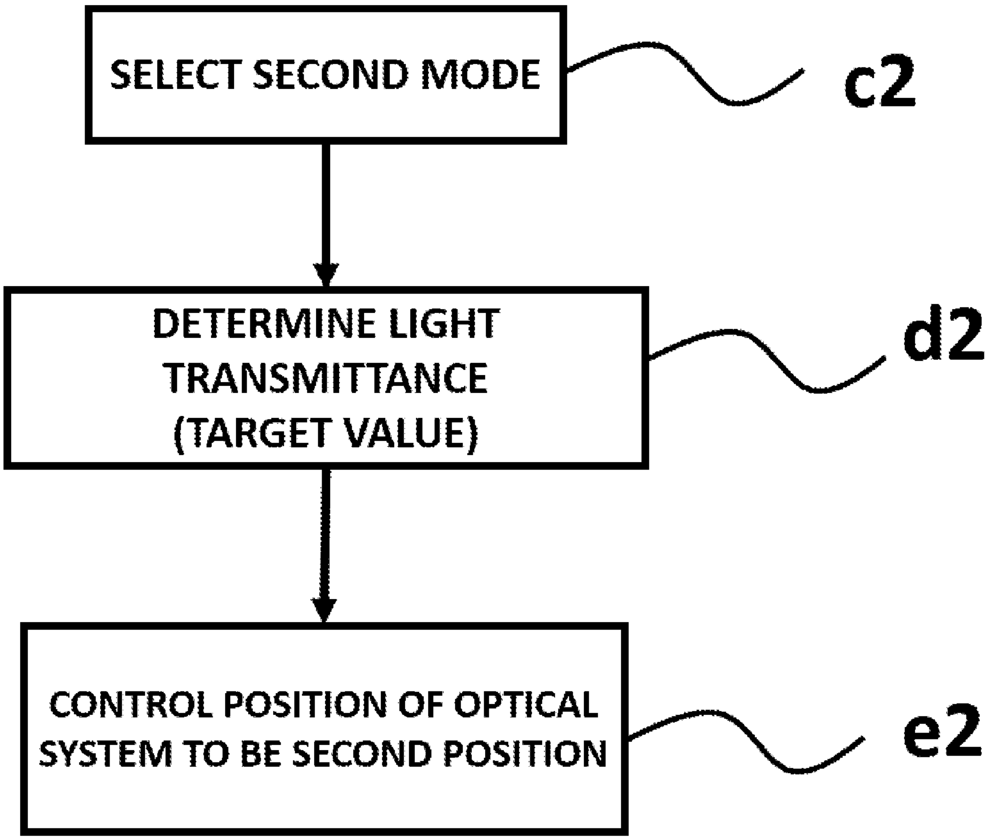
FIG. 10 is a flowchart illustrating detailed steps of a light transmittance control step and an optical system position control step when the second control mode is executed.

Further, as illustrated in FIG. 10, in a case where the second mode is determined as the light irradiation mode in step (c), step (d) may include step (d2) of controlling, by the control unit 400, the selective transmission film 100 by determining the light transmittance of the selective transmission film 100 to be a predetermined target value, and step (e) may include step (e2) of controlling, by the control unit 400, the moving unit 300 to adjust at least one of the position of the first optical system 210 or the position of the second optical system 220 to be the second position. At this time, the light transmittance of the selective transmission film 100 may be adjusted to be similar to that of a general rear screen. Accordingly, a communication message may be displayed as light on the grille G when viewed from the outside of the vehicle.

The communication lamp configured as described above and the control method of the communication lamp according to the present invention are capable of implementing both a technology of performing light irradiation using a road surface in front of a vehicle as a screen and a technology of performing light irradiation using a vehicle grille as a screen without adding an additional component, by applying a polymer-dispersed liquid crystal (PDLC) film whose transmittance changes depending on whether or not a voltage is received and automatically adjusting a phase of an optical system according to the transmittance.

The present invention should not be construed to being limited to the embodiment described above. The present invention may be applied to various fields and may be variously modified by those skilled in the art without departing from the scope of the present invention claimed in the claims. Therefore, it is obvious to those skilled in the art that these alterations and modifications fall in the scope of the present invention.

What is claimed is:

1. A communication lamp comprising:

a selective transmission film whose light transmittance is adjusted according to a control signal;

an optical system including a light source, first and second optical systems irradiated with light from the light source and configured to transfer the light to outside the communication lamp, and a housing in which the first optical system and the second optical system are housed;

a moving unit configured to move the first and second optical systems linearly along grooves or protrusions inside the housing; and a control unit configured to receive information from inside the communication lamp and outside the communication lamp, and configured to control the selective transmission film, the light source, and the moving unit based on the received information.

2. A communication lamp comprising:

a selective transmission film whose light transmittance is adjusted according to a control signal;

an optical system including a light source, first and second optical systems irradiated with light from the light source and configured to transfer the light to outside the communication lamp, and a housing in which the first optical system and the second optical system are housed;

a moving unit configured to change positions of the first and second optical systems; and a control unit configured to receive information from inside the communication lamp and outside the communication lamp, and configured to control the selective transmission film, the light source, and the moving unit based on the received information, wherein:

the housing has a central portion extending in a predetermined extension direction and an intersecting portion extending in a direction perpendicular to the central portion and having a predetermined region intersecting the central portion, the selective transmission film is disposed outside the housing and disposed on one side of the housing in the extension direction of the central portion, the first optical system is housed in the central portion, and the second optical system is housed in the intersecting portion.

3. The communication lamp of claim 2, wherein:

the first optical system is housed in the central portion of the housing and is fixedly housed at an end portion on another side of the central portion, and the moving unit includes a first actuator that linearly moves the second optical system in the direction perpendicular to the central portion.

4. The communication lamp of claim 2, wherein the moving unit includes a first actuator configured to linearly move the second optical system in the direction perpendicular to the central portion, and a second actuator configured to linearly move the first optical system in the extension direction of the central portion.

5. The communication lamp of claim 2, wherein the control unit is configured to receive an average light intensity of a surrounding area, and the control unit is configured to control the light source in such a way that a light intensity of the light source becomes lower than a predetermined first light intensity criterion in a case where average light intensity of the surrounding area is equal to or higher than a predetermined reference value, and to control the light source in such a way that the light intensity of the light source becomes higher than the first light intensity criterion in a case where the average light intensity of the surrounding area is lower than the predetermined reference value.

6. The communication lamp of claim 2, wherein:

the control unit receives time information, and in a case where a current time is included in a predesignated night time zone, the control unit determines a first mode as a light irradiation mode, supplies power to the selective transmission film to increase the light transmittance to a maximum, and controls the moving unit in such a way that the optical system is at a first position where the light from the light source passes through only the first optical system.

7. The communication lamp of claim 2, wherein:

the control unit receives time information, and in a case where a current time is included in a predesignated day time zone, the control unit determines a second mode as a light irradiation mode, at least partially supplies power to the selective transmission film to perform control in such a way that the selective transmission film has a predetermined light transmittance, and controls the moving unit in such a way that the optical system is at a second position where the light from the light source sequentially passes through the first optical system and the second optical system.

8. A communication lamp comprising:

a selective transmission film whose light transmittance is adjusted according to a control signal;

an optical system including a light source, first and second optical systems irradiated with light from the light source and configured to transfer the light to outside the communication lamp, and a housing in which the first optical system and the second optical system are housed;

a moving unit configured to change positions of the first and second optical systems; and a control unit configured to receive information from inside the communication lamp and outside the communication lamp, and configured to control the selective transmission film, the light source, and the moving unit based on the received information, wherein:

the control unit receives navigation information, and in a case where the navigation information indicates that a current location is within an area designated as a downtown, the control unit determines a second mode as a light irradiation mode, at least partially supplies power to the selective transmission film to perform control in such a way that the selective transmission film has a predetermined light transmittance, and controls the moving unit in such a way that the optical system is at a second position where the light from the light source sequentially passes through the first optical system and the second optical system.

* * * * *